US012345086B2

(12) United States Patent
Yu

(10) Patent No.: US 12,345,086 B2
(45) Date of Patent: Jul. 1, 2025

(54) ELECTRICALLY DRIVEN SLIDING WINDOW FOR VEHICLE AND VEHICLE

(71) Applicant: JIANGSU CHANGNING ELECTRONICS CO., LTD., Jiangsu (CN)

(72) Inventor: Tian Yu, Jiangsu (CN)

(73) Assignee: JIANGSU CHANGNING ELECTRONICS CO., LTD., Jiangsu (CN)

(*) Notice: Subject to any disclaimer, the term of this patent is extended or adjusted under 35 U.S.C. 154(b) by 0 days.

(21) Appl. No.: 18/976,447

(22) Filed: Dec. 11, 2024

(65) Prior Publication Data

US 2025/0101783 A1 Mar. 27, 2025

Related U.S. Application Data

(63) Continuation of application No. PCT/CN2024/086046, filed on Apr. 3, 2024.

(30) Foreign Application Priority Data

Apr. 7, 2023 (CN) ........................ 202310366093.9

(51) Int. Cl.
*E05F 15/638* (2015.01)
*E05D 15/06* (2006.01)
(Continued)

(52) U.S. Cl.
CPC ........ *E05F 15/638* (2015.01); *E05D 15/0604* (2013.01); *E05D 15/0647* (2013.01);
(Continued)

(58) Field of Classification Search
CPC ... E05D 15/10; E05D 15/0604; E05D 15/638; E05D 15/655; E05D 15/0647;
(Continued)

(56) References Cited

U.S. PATENT DOCUMENTS 4,845,890 A * 7/1989 Terada ........................ B60J 1/12 49/128
5,613,323 A * 3/1997 Buening ................ B60J 1/1853 49/130
(Continued)

FOREIGN PATENT DOCUMENTS

CN 202899905 U 4/2013
CN 203361944 U 12/2013
(Continued)

OTHER PUBLICATIONS

International Search Report received in corresponding International Patent Application No. PCT/CN2024/086046, mailed Jul. 4, 2024, 13 pages.

(Continued)

*Primary Examiner* — Justin B Rephann
(74) *Attorney, Agent, or Firm* — Cooper Legal Group, LLC

(57) ABSTRACT

An electrically driven sliding window for vehicle and a vehicle include a window aperture, guide rails, bases, slide blocks, a movable glass unit and an electric drive mechanism, the guide rails are provided on two opposite sides of the window aperture respectively, the slide block includes a base mating portion and a guide rail mating portion, the slide block is slidably mounted on a base via the base mating portion and is mounted on a guide rail via the guide rail mating portion, the movable glass unit is fixed on the bases, and the slide blocks are slidable along the guide rails and are slidable relative to the bases by means of the electric drive mechanism, to drive the bases to perform a sliding movement parallel to a direction of the guide rails and a movement for alignment perpendicular to the direction of the guide rails.

9 Claims, 9 Drawing Sheets

(51) Int. Cl.
*E05D 15/10* (2006.01)
*E05F 15/655* (2015.01)

(52) U.S. Cl.
CPC ............ *E05D 15/10* (2013.01); *E05F 15/655* (2015.01); *E05Y 2201/708* (2013.01); *E05Y 2900/55* (2013.01)

(58) Field of Classification Search
CPC ....... E05D 2015/1039; E05Y 2201/708; E05Y 2900/55
See application file for complete search history.

(56) References Cited

U.S. PATENT DOCUMENTS

| | | | | |
|---|---|---|---|---|
| 6,119,401 | A * | 9/2000 | Lin | E05F 11/535 49/118 |
| 8,562,063 | B2 * | 10/2013 | Giret | E05D 15/1047 296/146.15 |
| 8,578,654 | B2 * | 11/2013 | Rao | E05F 11/535 49/413 |
| 10,266,037 | B2 * | 4/2019 | Hulst | E05D 15/0621 |
| 10,434,845 | B2 * | 10/2019 | Murasawa | B60J 1/18 |
| 10,518,611 | B2 * | 12/2019 | Murasawa | B60J 1/1853 |
| 10,882,382 | B2 * | 1/2021 | Otsubo | E05F 11/04 |
| 2007/0234644 | A1 * | 10/2007 | Jaeger | E05D 15/10 49/362 |
| 2018/0281569 | A1 * | 10/2018 | Otsubo | B60J 1/18 |
| 2019/0184793 | A1 * | 6/2019 | Murasawa | E05F 11/535 |
| 2019/0194992 | A1 * | 6/2019 | Murasawa | B60J 1/18 |

FOREIGN PATENT DOCUMENTS

| | | | |
|---|---|---|---|
| CN | 103790486 | A | 5/2014 |
| CN | 206477750 | U | 9/2017 |
| CN | 108397091 | A | 8/2018 |
| CN | 114043854 | A | 2/2022 |
| CN | 115519984 | A | 12/2022 |
| CN | 218702633 | U | 3/2023 |
| CN | 116065911 | A | 5/2023 |
| EP | 1916132 | A1 | 4/2008 |
| JP | H10100669 | A | 4/1998 |
| JP | 2015105087 | A | 6/2015 |

OTHER PUBLICATIONS

Office Action received in corresponding Chinese patent application No. 202310366093.9, dated May 11, 2023, 14 pages.

* cited by examiner

ELECTRICALLY DRIVEN SLIDING WINDOW FOR VEHICLE AND VEHICLE

CROSS-REFERENCE TO RELATED APPLICATION

This application is a continuation of PCT application serial no. PCT/CN2024/086046, filed on Apr. 3, 2024, which claims the priority and benefit of Chinese patent application serial no. 202310366093.9, filed on Apr. 7, 2023. The entireties of PCT application serial no. PCT/CN2024/086046 and Chinese patent application serial no. 202310366093.9 are hereby incorporated by reference herein and made a part of this specification.

TECHNICAL FIELD

The present application relates to the field of vehicle accessories, and, in particular, to an electrically driven sliding window for vehicle. Further, the present application relates to a vehicle.

BACKGROUND ART

The vehicle window is an important way of day lighting, and it also provides a way for the driver and passenger to observe the environment outside the vehicle, and also provides a way for the driver and passenger to escape when the vehicle accidentally overturns. In order to prevent air flow, rain and snow, etc. outside the vehicle from entering the vehicle through the vehicle window when the vehicle is running at a high speed, thereby affecting the vehicle's driving environment, a window glass is usually mounted at the vehicle window.

The vehicle window is generally of a sliding structure, by which a stationary window and a movable window are usually provided in a window aperture, where the stationary window is usually provided at one side of the window aperture, a slide rail is provided on the inner side of the stationary window, the movable window is mounted on the slide rail, and the opening and closing of the vehicle window is achieved by sliding the movable window on the slide rail. In some windows, two slide rails parallel to each other are provided in the window aperture, one movable window is arranged on a slide rail, and the opening and closing of the window is achieved by sliding the two movable windows on the respective slide rails. The sliding window has the advantages of stable structure and small occupied space.

In the existing sliding window, two sashes which are slidable relative to each other are usually arranged at different positions inside and outside the window aperture, and the two sashes are located on two different planes in a closed state of window. The position difference between the two sashes inside and outside the window aperture may not only increase the resistance when the vehicle is running at high speed, but also increase the vibration of the vehicle window when the vehicle is running, and may result in poor impressions on the window.

SUMMARY

In order to reduce the vibration of the vehicle window when the vehicle is running and reduce the driving resistance, the present application provides an electrically driven sliding window for vehicle and a vehicle.

The electrically driven sliding window for vehicle provided in the present application adopts the following technical solution.

An electrically driven sliding window for vehicle includes a window aperture, guide rails, bases, slide blocks, a movable glass unit and an electric drive mechanism, where the guide rails are provided on two opposite sides of the window aperture respectively, each of the slide blocks includes a base mating portion and a guide rail mating portion, each of the slide blocks is slidably mounted on a respective one of the bases via the base mating portion and is mounted on a respective one of the guide rails via the guide rail mating portion, the movable glass unit is fixed on the bases, and the slide blocks are slidable along the guide rails and are slidable relative to the bases by means of the electric drive mechanism, to drive the bases to perform a sliding movement parallel to a direction of the guide rails and a movement for alignment perpendicular to the direction of the guide rails.

By adopting the above-mentioned technical solution, the guide rail mating portion of the slide block is mounted on the guide rail, such that the movable glass unit may slide along the direction of the guide rail to open and close the sliding window for vehicle. The base mating portion of the slide block is slidably mounted on the base, so that the movable glass unit may perform a movement for alignment in the direction perpendicular to the guide rail, so that the outer side of the movable glass unit is in alignment with the outer side of the window aperture, thereby reducing the resistance of the window and the vibration of the window when the vehicle is running. The electric drive mechanism drives the slide block, so as to electrically drive the movable glass unit to slide and to move for alignment, thereby improving the convenience of the control of the movable glass unit.

In a specific embodiment, the electrically driven sliding window for vehicle of the present application further includes a movement controlling mechanism, where each of the bases includes a glass mounting portion and a guide portion, the glass mounting portion is parallel to the guide rails, the guide portion is provided with a slide rail for alignment, the movable glass unit is fixed on the glass mounting portion, the slide rail for alignment extends along the glass mounting portion, a distance of the slide rail for alignment from an inside of the glass mounting portion is different from a distance of the slide rail for alignment from an outside of the glass mounting portion, the base mating portion is mounted on the slide rail for alignment, and the movement controlling mechanism is configured to control a sliding of each of the slide blocks on the slide rail for alignment to realize a sliding movement or a movement for alignment of the movable glass unit.

By adopting the above-mentioned technical solution, the sliding of the slide block may be controlled by the movement controlling mechanism to control whether the slide block slides relative to the slide rail for alignment under the drive of the electric drive mechanism, so as to control whether the movable glass unit performs the sliding movement or the movement for alignment.

In a specific embodiment, the movement controlling mechanism includes a toggle, a torsion spring and a guide block for alignment, the toggle includes a rotary mounting portion and a driving lever and is rotatably mounted on the guide portion via the rotary mounting portion, the torsion spring is mounted between the toggle and the guide portion to push the driving lever into contact with a respective one of the slide blocks, to limit a movement of the respective one of the slide blocks on the slide rail for alignment, and the guide block for alignment is fixed on an end of a respective one of the guide rails adjacent to the window aperture to push the driving lever to move in a direction away from the slide rail for alignment when the movable glass unit slides to a position directly opposite the window aperture.

By using the above-mentioned technical solution, with the toggle and the torsion spring, a continuous elastic force may be applied to the toggle, so that the driving lever abuts against the slide block, to prevent the slide block from moving from the middle part of the slide rail for alignment to the end, so the movement of the slide block may drive the movable glass unit to move in the direction for closing the window. With the guide block for alignment, when the movable glass unit is pushed to the position directly opposite the window aperture, the driving lever may be pushed away from the slide rail for alignment, so that the slide block may move from the middle to the end of the slide rail for alignment, thereby driving the movable glass unit to perform the movement for alignment in the direction towards the window aperture.

In a specific embodiment, the guide portion is further provided with base limiting blocks, the base limiting blocks are provided at two ends of the guide portion respectively, each of the guide rails is provided with a limit block for opening movement and a limit block for closing movement, the guide block for alignment is configured with a guide surface and a push rod for toggle, the limit block for opening movement is provided at a position at an end of each of the guide rails away from the window aperture opposite the base limiting block, the guide surface is provided at a position directly opposite the base limiting block, the limit block for closing movement and the guide surface are configured to limit the base limiting block at each of two ends of the guide portion when the movable glass unit is in the window aperture, and the push rod for toggle is configured to press the driving lever when the movable glass unit moves to the position directly opposite the window aperture, so as to push the driving lever away from the respective one of the slide blocks.

By adopting the above-mentioned technical solution, the base limiting block cooperates with the limit block for opening movement, so as to define the opening extreme position of the movable glass unit, while the guide surface cooperates with the limit block for closing movement, so as to define the closing extreme position of the movable glass unit. The limit block for closing movement and the guide surface cooperate with the two base limiting blocks, so as to limit the sliding movement of the movable glass unit when the movable glass unit moves to be in alignment with the window aperture, and by which the movement of the slide block may only drive the movable glass unit to perform the movement for alignment in the direction perpendicular to the window aperture.

In a particular embodiment, the base mating portion includes a first clamping edge, a second clamping edge and a clamping arm, the first clamping edge and the second clamping edge are respectively provided on two opposite sides of the clamping arm, so that a sliding groove adapted to the slide rail for alignment is formed among the first clamping edge, the second clamping edge and the clamping arm.

By adopting the above-mentioned technical solution, with the first clamping edge, the second clamping edge and the clamping arm, the slide rail for alignment may be surrounded at a plurality of faces around the slide rail for alignment, which improves the sliding stability of the slide block on the slide rail for alignment, and additionally, the movement in a plurality of directions of the base may be realized by the slide block.

In a specific embodiment, each of the slide blocks further includes a keyslot in a middle of each of the slide blocks, and the slide blocks are connected to the electric drive mechanism via the keyslot.

By adopting the above-mentioned technical solution, a convenient connection between the slide block and the electric drive mechanism may be established by the keyslot in the middle of the slide block, and the slide block may be driven to slide stably relative to the guide rail and the base by the electric drive mechanism.

In an optional embodiment, the window aperture is defined on a stationary window, and the movable glass unit includes a movable glass, a frame for the movable glass on an edge of the movable glass, and a seal of the movable glass between the frame for the movable glass and the stationary window.

By adopting the above-mentioned technical solution, the opening and closing of the small window aperture on the stationary window may be realized by the translation of the movable glass unit with respect to the stationary window with the arrangement of the window aperture on the stationary window. Using the seal of the movable glass may improve the tightness between the movable glass unit and the stationary window and reduce the vibration of the movable glass unit.

In a specific embodiment, the electric drive mechanism includes a motor holder, a first drive flexible shaft, a guide tube for the first drive flexible shaft, a second drive flexible shaft, a guide tube for the second drive flexible shaft, drivers and a drive motor, the first drive flexible shaft and the second drive flexible shaft both extend through the motor holder, the guide tube for the first drive flexible shaft is sleeved on the first drive flexible shaft, such that one end of the first drive flexible shaft is located in a first guide rail of the guide rails on a first side of the window aperture and extends along the guide rails, the guide tube for the second drive flexible shaft is sleeved on the second drive flexible shaft, such that one end of the second drive flexible shaft is located in a second guide rail of the guide rails on a second side of the window aperture and extends along the guide rails, the drivers are respectively arranged on the first drive flexible shaft and the second drive flexible shaft and are connected to a respective one of the slide blocks respectively, and the drive motor is fixed on the motor holder to drive the first drive flexible shaft and the second drive flexible shaft to move synchronously to opposite sides of the motor holder.

By using the above-mentioned technical solution, the first drive flexible shaft and the second drive flexible shaft both extend through the motor holder, such that the first drive flexible shaft and the second drive flexible shaft may be driven to move synchronously in two opposite directions simultaneously by the drive motor on the motor holder, so that the movable glass unit may be driven to move on two opposite sides of the movable glass unit. By means of the guide tube for the first drive flexible shaft and the guide tube for the second drive flexible shaft, it is possible to better control the movement direction of the ends of the first drive flexible shaft and the second drive flexible shaft, so that their movement direction coincides with the direction of the guide rail.

In a specific embodiment, each of the drivers includes a driver body and a drive block, the drive block is fixed on one side of the driver body, the driver body is connected to the first drive flexible shaft or the second drive flexible shaft, and the drive block is connected to a respective one of the slide blocks.

By adopting the above-mentioned technical solution, a reliable connection with the first drive flexible shaft and the second drive flexible shaft may be established by using the driver body. By means of a drive block at one side of the driver body, a convenient connection with the slide block may be established.

The vehicle of the present application also has the above-mentioned advantages by using the electrically driven sliding window for vehicle of by the present application.

In summary, the present application includes at least one of the following beneficial technical effects.

1. With the cooperation of the slide block and the base, the slide block may drive the base to perform a sliding movement parallel to the direction of the guide rail and the movement for alignment perpendicular to the direction of the guide rail, to realize the opening and closing action of the movable glass unit and the movement for alignment with and deviation from the window aperture, so that the movable glass unit is located at the position in alignment with the window aperture in the closed state to reduce the resistance of and the vibration of the window when the vehicle is running, and is located at a position deviating from with the window aperture in the open state and performing the opening and closing action, which is convenient for the sliding movement of the movable glass unit.
2. The sliding movement of the slide block may be converted into the movement for alignment of the base due to the sliding fit with the base by means of the base mating portion. The trajectory of the sliding movement of the slide block may be limited by the guide rail mating portion, which is beneficial to ensure the stability of the sliding movement of the movable glass unit.
3. The movement controlling mechanism may be used to switch the driving mode of the slide block to the base according to the position and movement trend of the movable glass unit, so that when the movement of the slide block is switched, the movable glass unit is driven to perform the sliding movement or the movement for alignment.
4. A reliable, stable fit between the first drive flexible shaft and the second drive flexible shaft and the slide block, and a reliable electric drive of the movable glass unit may be realized by the cooperation between the drive block and the keyslot.

DETAILED DESCRIPTION

The embodiments of the present application will be further described below in details in conjunction with the drawings. It should be understood that the embodiments described herein are illustrative and explanatory only and are not intended to restrict the present invention.

In the description of the present application, it should be noted that, unless otherwise specified, the orientation or positional relationship indicated by the terms such as "up, down" is based on the orientation or positional relationship of the electrically driven sliding window for vehicle of the present application in normal use. The terms such as "inside" and "outside" are based on the orientation or positional relationship of the electrically driven sliding window for vehicle of the present application when it is normally installed on a vehicle for use, where the position close to the central position inside the vehicle is "in". The description of the orientation or positional relationship of the electrically driven sliding window for vehicle and parts thereof in the present application is consistent with the installation orientation in actual use.

In the description of the present application, it should be noted that, unless otherwise specified and limited, the terms "installation", and "connection" should be understood broadly, for example, they can be fixed connection, detachable connection, or integrated connection; or, alternatively, it can be directly connected, or indirectly connected via an intermediate medium, or it can be internal communication between two components or interaction between two components. For those skilled in the art, the specific meanings of the above terms in the present application can be understood in particular circumstances.

In this description, the terms "first" and "second" are used for descriptive purposes only and are not to be construed as indicating or implying relative importance or implicitly indicating the number of technical features indicated, and thus features defined as "first" and "second" may explicitly or implicitly include one or more of the stated features.

Figure 1:
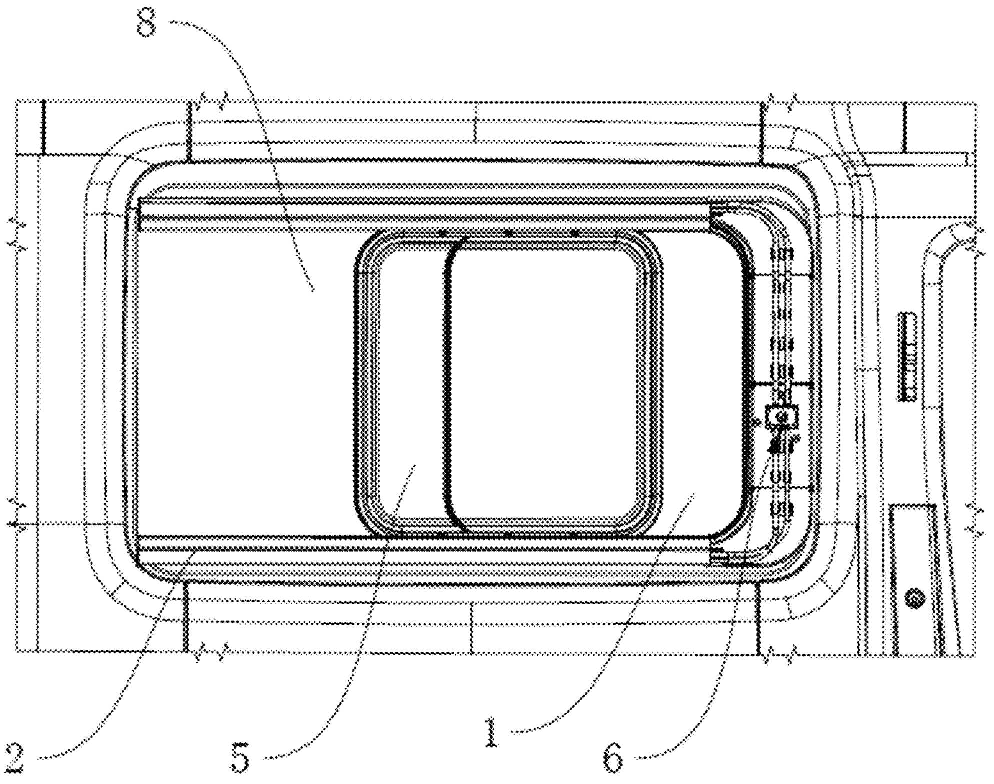
FIG. 1 is a schematic diagram showing an active state of the electrically driven sliding window for vehicle according to an embodiment of the present application.
Figure 2:
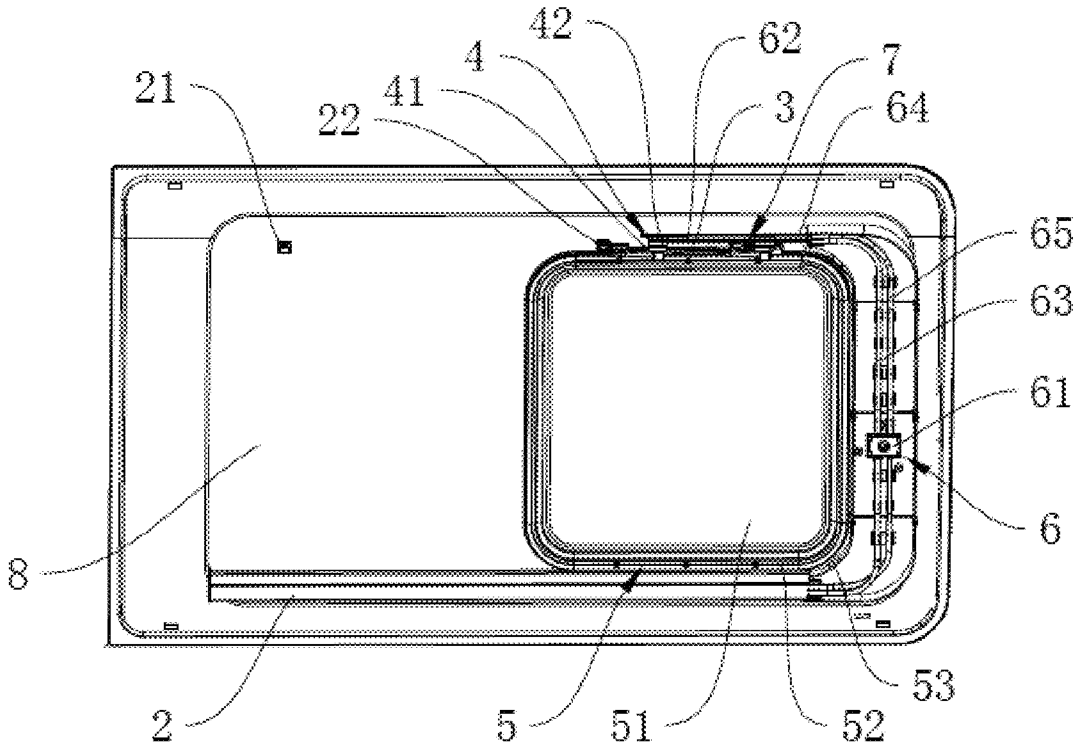
FIG. 2 is a schematic diagram showing the structure of an electrically driven sliding window for vehicle according to an embodiment of the present application.

An embodiment of the electrically driven sliding window for vehicle of the present application is shown in FIGS. 1 and 2 and includes a window aperture 1, guide rails 2, a base 3, a slide block 4, a movable glass unit 5 and an electric drive mechanism 6. The window aperture 1 is defined at a vehicle body, or may be defined at an auxiliary structure of the vehicle body, such as a vehicle door or a stationary window of the vehicle body, to form a hole that connects the space inside and outside the vehicle body. The guide rails 2 is arranged on two opposite sides of the window aperture 1, generally the upper and lower sides of the window aperture 1, and the guide rails 2 on the upper and lower sides of the window aperture 1 are parallel to each other.

The slide block 4 includes a base mating portion 41 and a guide rail mating portion 42 located at two opposite ends of the slide block 4, where the base mating portion 41 and the guide rail mating portion 42 may be respectively machined and shaped and then connected together to form the slide block 4, or may be integrally machined and shaped from one and the same material. The base mating portion 41 is provided with a structure for fitting with the base 3, and is mounted on the base 3 by this structure to form a sliding connection with the base 3, so that the slide block 4 may slide on the base 3. The guide rail mating portion 42 is provided with a structure for fitting with the guide rail 2, and is mounted on the guide rail 2 via this structure to form a sliding connection with the guide rail 2, so that the slide block 4 may slide along the guide rail 2 at the same time.

The base 3 is able to slide along the guide rail 2 together with the slide block 4, and is able to slide relative to the slide block 4. The sliding of the base 3 along the guide rail 2 enables the base 3 to move between a position directly opposite the window aperture 1 and a position off to the side of the window aperture 1, forming a sliding movement of the base 3. The sliding of the base 3 relative to the slide block 4 enables the base 3 to move in a direction perpendicular to the window aperture 1 at a position directly opposite the window aperture 1, resulting in a movement for alignment of the base 3.

The movable glass unit 5 is a movable window structure for covering the window aperture 1. The movable glass unit 5 is fixed to the base 3 and may move together with the base 3. When the movable glass unit 5 moves along the direction of the guide rail 2, the movable glass unit 5 may be moved to a position overlapping with the window aperture 1, which is defined as an action for closing window, alternatively, the movable glass unit 5 is moved to a position off to the side of the window aperture 1, which is defined as an action for opening window.

When the movable glass unit 5 moves to the position overlapping the window aperture 1, the movable glass unit 5 may move outwards along with the base 3 in the direction perpendicular to the window aperture 1 to move the outer side surface of the movable glass unit 5 to a position in alignment with the outer side surface of the vehicle body or accessory structure of the vehicle body around the window aperture 1, which, on the one hand, forms a reliable seal for the window aperture 1, thereby preventing wind and rain outside the vehicle from entering the vehicle interior, on the other hand, makes the window aperture 1 and the outer side surface around the window aperture 1 smoother, thereby reducing the driving resistance of the vehicle while reducing the vibration of the movable glass unit 5 when pushed by the air resistance, so as to improve the NVH (noise, vibration and sound vibration roughness) comfort of the vehicle, and additionally is capable of achieving a flush appearance of the entire vehicle, and thus improving the visual perception of the vehicle.

When the window is opened, the movable glass unit 5 may move inwardly along with the base 3 in the direction perpendicular to the window aperture 1 to move the movable glass unit 5 to a position offset to the inner side of the vehicle body or the accessory structure of the vehicle body around the window aperture 1, so that the movable glass unit 5 may move to the position offset to the side of the window aperture 1 on the inner side of the vehicle body or the accessory structure of the vehicle body, preventing the movable glass unit 5 from interfering with the vehicle body or the accessory structure of the vehicle body.

The electric drive mechanism 6 may be various possible electric drive configurations.

The electric drive mechanism 6 is in driving connection with the slide block 4, such that the slide block 4 may slide along the guide rail 2 and/or relative to the base 3 by the electric drive mechanism 6, thereby achieving the action for opening and closing the window of the movable glass unit 5. The use of the electric drive mechanism 6 may facilitate the control of the movable glass unit 5 and increase the degree of automation of the action for opening and closing the window.

Figure 3:
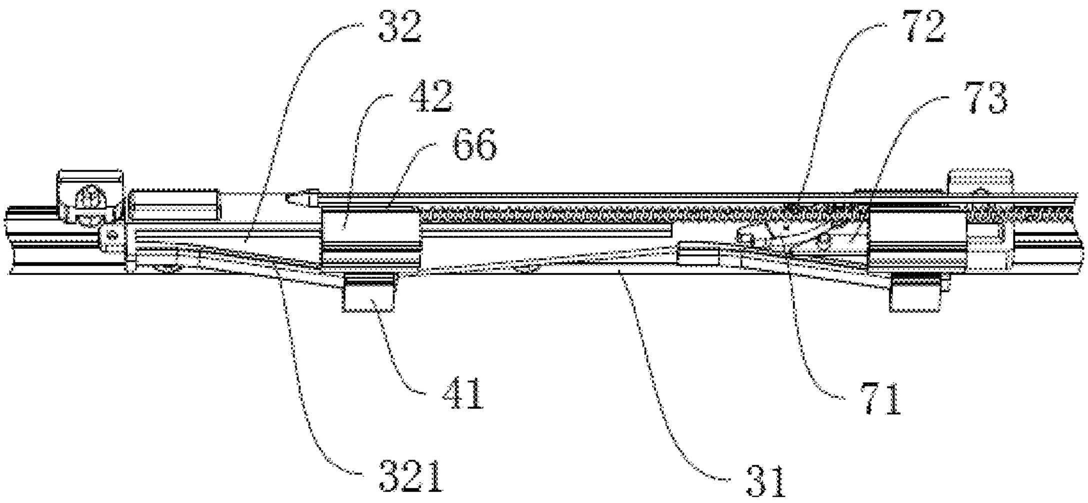
FIG. 3 is a partial schematic diagram showing a base of an electrically driven sliding window for vehicle according to an embodiment of the present application.

In some embodiments of the electrically driven sliding window for vehicle of the present application, as shown in FIGS. 2 and 3, the base 3 is further provided with a movement controlling mechanism 7. The movement controlling mechanism 7 may control the movement state of the base 3 according to the position of the base 3, so that when the movable glass unit 5 fixed on the base 3 is located at the position directly opposite the window aperture 1, the movement of the slide block 4 may drive the base 3 to move in the direction perpendicular to the window aperture 1 for alignment, and when the movable glass unit 5 is located at the position deviating from the window aperture 1, the movement of the slide block 4 may drive the base 3 to slide to the position offset to the side of the window aperture 1.

The base 3 includes a glass mounting portion 31, which extends vertically as a whole, and a guide portion 32, which extends horizontally as a whole. The length direction of the glass mounting portion 31 and the direction of the guide rail 2 are parallel to each other, and the upper side and the lower side of the movable glass unit 5 are respectively fixed on the glass mounting portion 31 of one base 3, so that when the base 3 slides along the guide rail 2, the movable glass unit 5 may move in the same plane. The inner side edge of the guide portion 32 is provided with a slide rail for alignment 321, the slide rail for alignment 321 is generally designed as a rectangular protrusion protruding towards the upper and lower sides of the guide portion 32. A rectangular sliding groove adapted to the slide rail for alignment 321 is defined at the base mating portion 41, and the base mating portion 41 is mounted on the slide rail for alignment 321 via the rectangular sliding groove, so that the slide block 4 may slide along the slide rail for alignment 321.

The slide rail for alignment 321 extends in the length direction of the guide portion 32, that is, in the length direction of the glass mounting portion 31, and the projection of the slide rail for alignment 321 on a horizontal plane is located on the inner side of the projection of the glass mounting portion 31 on the horizontal plane. The distance between the projection of the slide rail for alignment 321 on the horizontal plane and that of the glass mounting portion 31 on the horizontal plane is different along the extension of the slide rail for alignment 321.

Figure 4:
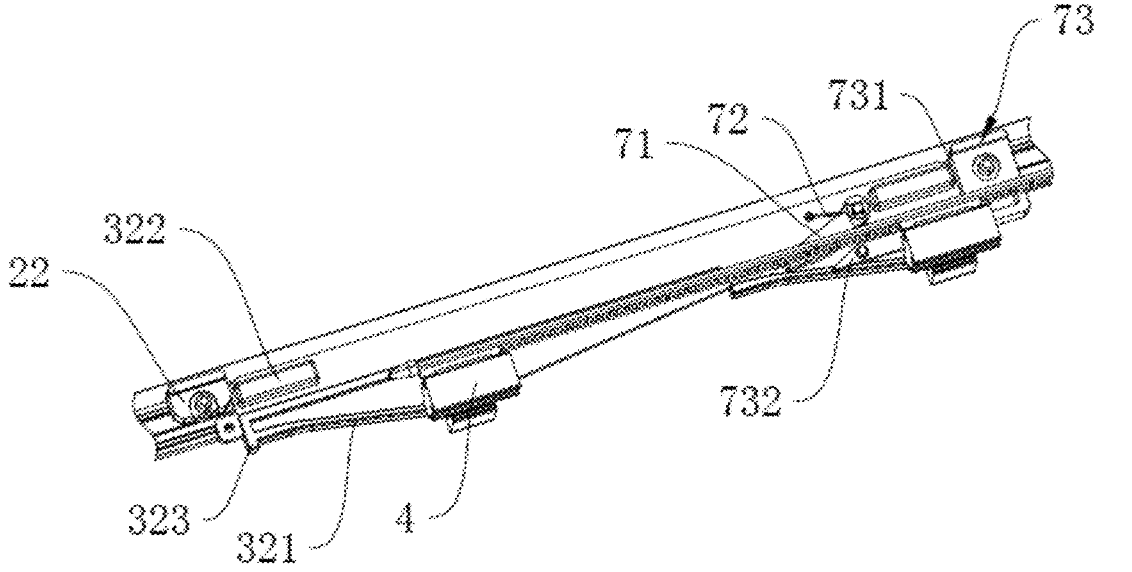
FIG. 4 is a schematic diagram showing the position of the slide block in the closed alignment state of the electrically driven sliding window for vehicle according to an embodiment of the present application.
Figure 5:
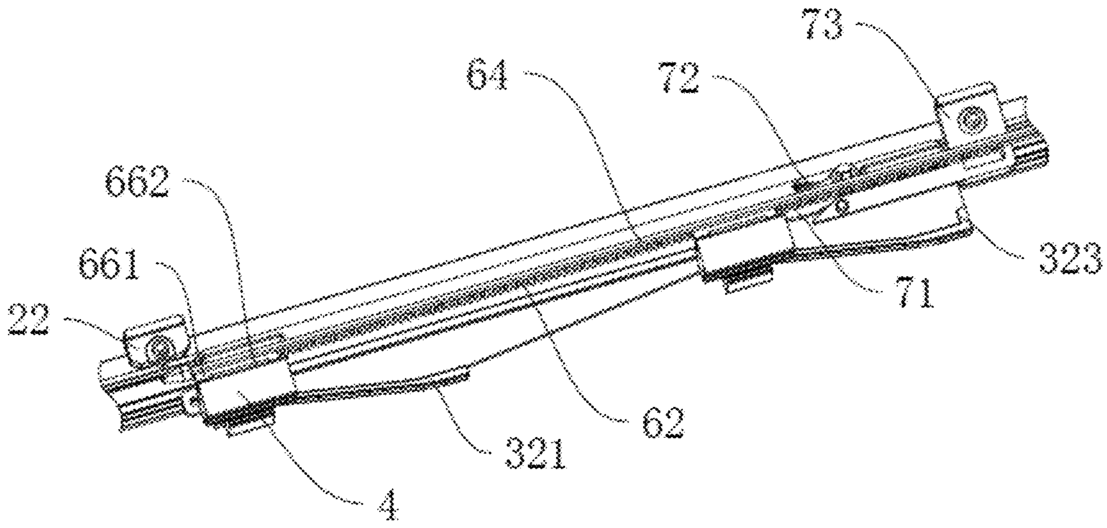
FIG. 5 is a schematic diagram showing the position of a slide block in a state where a movable glass unit is direct opposite the window aperture of an electrically driven sliding window for vehicle according to an embodiment of the present application.
Figure 6:
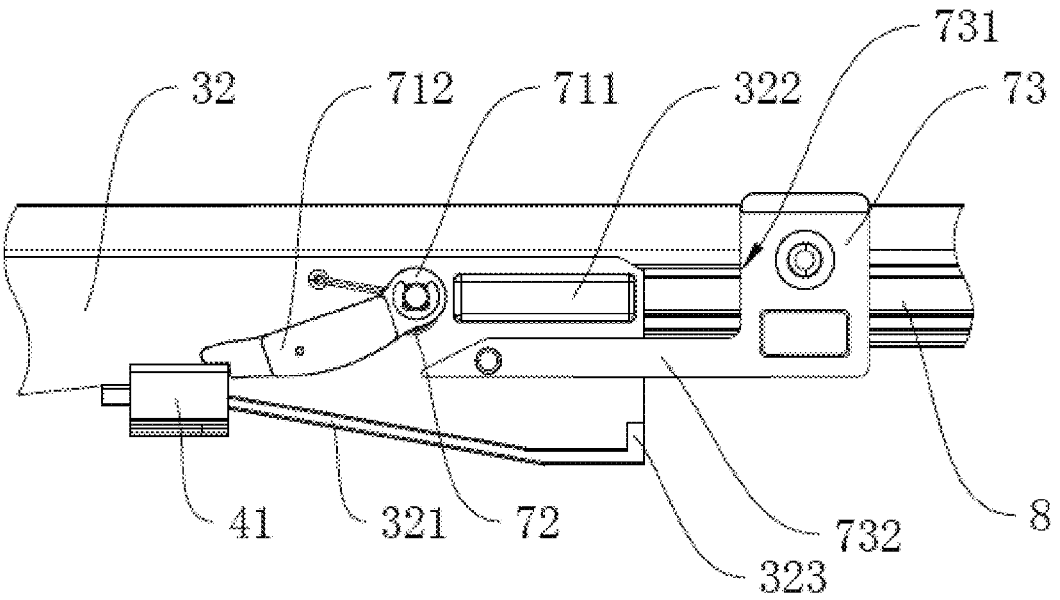
FIG. 6 is a schematic diagram showing a movement controlling mechanism in an open state of an electrically driven sliding window for vehicle according to an embodiment of the present application.
Figure 7:
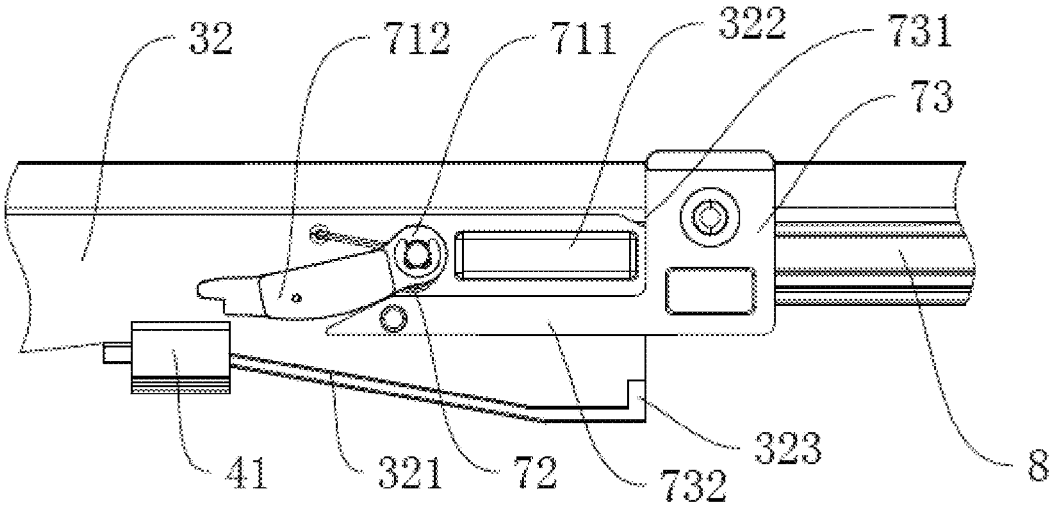
FIG. 7 is a schematic diagram showing a movement controlling mechanism in a state where a movable glass unit approaches a window aperture of an electrically driven sliding window for vehicle according to an embodiment of the present application.

As shown in FIGS. 3 to 5, the slide block 4 is mounted on the slide rail for alignment 321 via the base mating portion 41. The extension of the slide rails for alignment 321 is generally the same on two sides of the guide portion 32. Two slide blocks 4 are mounted on the guide portion 32, and the two slide blocks 4 are respectively mounted on the slide rails for alignment 321 on the two sides of the guide portion 32, and may synchronously slide on the slide rails for alignment 321.

When the slide block 4 slides in the closed direction of the movable glass unit 5, the distance between the slide block 4 and the glass mounting portion 31 in the direction perpendicular to the window aperture 1 gradually increases. The guide rails 2 are fixed on the upper side and lower side of the window aperture 1, and when the slide block 4 slides on the guide rail 2, the position thereof in the direction perpendicular to the window aperture 1 is unchanged, therefore, when the glass mounting portion 31 gradually moves in the direction towards the outer side of the window aperture 1, the movable glass unit 5 fixed on the glass mounting portion 31 also performs the movement for alignment in the direction towards the outer side of the window aperture 1.

On the contrary, when the slide block 4 slides in the opening direction of the movable glass unit 5, the distance between the slide block 4 and the glass mounting portion 31 in the direction perpendicular to the window aperture 1 gradually decreases, while when the slide block 4 slides on the guide rails 2, the position thereof in the direction perpendicular to the window aperture 1 is unchanged, therefore, the glass mounting portion 31 gradually moves in the direction towards the inner side of the window aperture 1, and the movable glass unit 5 fixed on the glass mounting portion 31 also moves in the direction towards the inner side of the window aperture 1, so that the movable glass unit 5 leaves the window aperture 1 and is located at the inner side of the window aperture 1.

The movement controlling mechanism 7 may control the movement of the slide block 4 driven by the electric drive mechanism 6, and may limit the further sliding movement of the base 3 when the base 3 reaches the position directly opposite the window aperture 1, and additionally, may slide the slide block 4 with respect to the slide rail for alignment 321 to realize the movement for alignment of the movable glass unit 5. However, when the base 3 is away from the position directly opposite the window aperture 1, the movement controlling mechanism 7 may restrict the sliding of the slide block 4 on the slide rails for alignment 321, so that the base 3 slides along the guide rail 2 synchronously with the slide block 4 to realize the sliding movement of the movable glass unit 5.

In an optional embodiment of the electrically driven sliding window for vehicle of the present application, as shown in FIGS. 4 to 7, the movement controlling mechanism 7 includes a toggle 71, a torsion spring 72 and a guide block for alignment 73. The toggle 71 is made of a metal material and includes a rotary mounting portion 711, on which a mounting hole is provided, and a driving lever 712. The toggle 71 is mounted on the guide portion 32 through the mounting hole on the rotary mounting portion 711, such that the rotary mounting portion 711 may rotate on the guide portion 32 with the mounting hole as a rotation axis. The driving lever 712 is provided at one side of the rotary mounting portion 711, and the free end thereof extends in the direction to the middle of the slide rail for alignment 321.

The torsion spring 72 is mounted between the toggle 71 and the guide portion 32, one end of the torsion spring 72 is fixed on the driving lever 712, and the other end is fixed on the guide portion 32. The elasticity of the torsion spring 72 may push the toggle 71 to generate a rotation tendency, and push the driving lever 712 to move in the direction towards the slide rail for alignment 321. A clamping step may also be provided on the free end of the driving lever 712, and when the base 3 is away from the position directly opposite the window aperture 1, the driving lever 712 is pushed to abut against the slide block 4 under the elastic force of the torsion spring 72, so that the clamping step is clamped on the edge of the slide block 4, thereby restricting the movement of the slide block 4 on the slide rail for alignment 321. At this time, when the slide block 4 moves by means of the electric drive mechanism 6, the base 3 moves synchronously with the slide block 4, so as to drive the movable glass unit 5 to perform the sliding movement for opening and closing the window on the position offset to the side of the window aperture 1.

A guide block for alignment 73 is secured to the end of the guide rail 2 adjacent the window aperture 1. When the base 3 moves with the slide block 4 to a position close to the window aperture 1, the guide block for alignment 73 may press the driving lever 712, to push the driving lever 712 to move away from the slide rail for alignment 321 against the elastic force of the torsion spring 72, so that the clamping step on the driving lever 712 gradually moves away from the slide block 4. When the base 3 is moved to the position directly opposite the window aperture 1, the driving lever 712 is disengaged from the slide block 4 while the guide block for alignment 73 is in contact with the base 3, preventing the further sliding movement of the base 3. At this time, the slide block 4 slides on the slide rail for alignment 321 by means of the electric drive mechanism 6, so as to realize the movement for alignment of the base 3, so that the movable glass unit 5 moves to a position in alignment with the edge of the window aperture 1 in the direction towards the outside of the window aperture 1.

When the electric drive mechanism 6 drives the slide block 4 to move in the opening direction of the movable glass unit 5, the slide block 4 slides in the opposite direction on the slide rail for alignment 321, so that the movable glass unit 5 leaves the window aperture 1 and performs the movement for alignment to the inner side of the window aperture 1. The ends of the slide rail for alignment 321 at the two ends of the base 3 are provided with baffles for slide block 323 perpendicular to the slide rail for alignment 321, and the baffles for slide block 323 may prevent the further sliding of the slide block 4, so that the base 3 performs the sliding movement along with the slide block 4 in the opening direction of the movable glass unit 5. At this time, the guide block for alignment 73 gradually moves away from the driving lever 712, the driving lever 712 abuts against the slide block 4 under the push of the torsion spring 72, and is stuck on the edge of the slide block 4 to restrict the position of the slide block 4. Thus, the movement of the slide block 4 driven by the electric drive mechanism 6 may cause the sliding movement of the base 3, resulting in the action for opening and closing the window of the movable glass unit 5.

As a specific embodiment of the electrically driven sliding window for vehicle of the present application, as shown in FIGS. 2 and 4-7, both ends of the guide portion 32 are provided with a base limiting block 322 respectively, and additionally, a limit block for opening movement 21 and a limit block for closing movement 22 are respectively provided on the guide rail 2. The limit block for opening movement 21 is provided at the end of the guide rail 2 away from of the window aperture 1, and when the base 3 moves in the opening direction, the base limiting block 322 at one end of the guide portion 32 may contact the limit block for opening movement 21, thereby limiting the maximum opening movement range of the base 3. The limit block for closing movement 22 is arranged at a side of the window aperture 1 in the opening direction thereof and is located at an outer side of the guide rail 2, so that when the base 3 moves in the closed direction, the limit block for closing movement 22 does not affect the movement of the base 3. In addition, when the base 3 moves to the outer side of the window aperture 1 to a position in alignment with the outer side of the edge of the window aperture 1, the limit block for closing movement 22 may contact the base limiting block 322 at the end of the guide portion 32 in the opening direction to limit the movement of the base 3 at one side.

The guide block for alignment 73 is provided with a guide surface 731 and a push rod for toggle 732. The guide surface 731 is provided directly opposite the base limiting block 322 at the end of the guide portion 32 in the closed direction. When the base 3 moves in the closed direction, the guide surface 731 may stop the base limiting block 322 to prevent the further sliding movement of the base 3. The guide block for alignment 73 is provided, such that when the base limiting block 322 is in contact with the guide surface 731, the movable glass unit 5 is exactly in the position directly opposite the window aperture 1. When the outer side of the movable glass unit 5 is moved to the position in alignment with the outer side of the edge of the window aperture 1 so that the window aperture 1 is in a closed state, the limit block for closing movement 22 and the guide surface 731 come into contact with the base limiting block 322 at two ends of the base 3, which limits the sliding movement of the base 3, so as to prevent the movable glass unit 5 from generating vibration during running of the vehicle, generating noise by colliding with the edge of the window aperture 1, or causing damage to the window aperture 1 and/or the movable glass unit 5.

The push rod for toggle 732 is provided on the side of the guide block for alignment 73 facing the base 3. When the base 3 moves to a position near the guide block for alignment 73, the push rod for toggle 732 may contact with the inner side of the driving lever 712 along the guide portion 32, so as to press the driving lever 712 from the inner side of the driving lever 712 to push the driving lever 712 to rotate in a direction away from the slide rail for alignment 321, so that when the movable glass unit 5 moves to the position directly opposite the window aperture 1, the driving lever 712 moves away from the slide block 4, so that the slide block 4 may slide on the slide rail for alignment 321 to push the base 3 to move for alignment.

Figure 8:
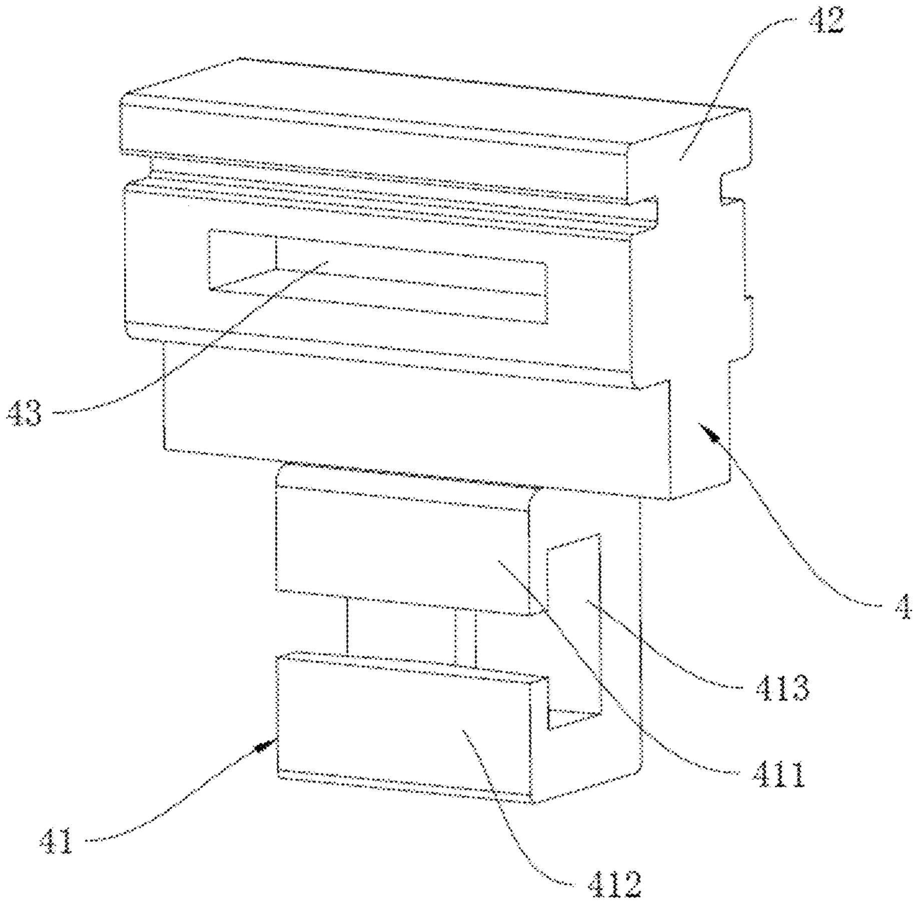
FIG. 8 is a schematic diagram showing the structure of a slide block of the electrically driven sliding window for vehicle according to an embodiment of the present application.

In some embodiments of the electrically driven sliding window for vehicle of the present application, as shown in FIG. 8, the base mating portion 41 includes a first clamping edge 411, a second clamping edge 412, and a clamping arm 413. The clamping arm 413 is designed as a frame shape with an open side, the first clamping edge 411 and the second clamping edge 412 are respectively provided at the open side of the clamping arm 413 and are opposite to each other, so that a rectangular sliding groove adapted to the slide rail for alignment 321 is formed among the first clamping edge 411, the second clamping edge 412 and the clamping arm 413, and when the base mating portion 41 slides on the slide rail for alignment 321, the first clamping edge 411, the second clamping edge 412 and the clamping arm 13 may fit with the slide rail for alignment 321 from a plurality of positions around the slide rail for alignment 321, which ensures the accuracy of the relative movement trajectory between the base mating portion 41 and the slide rail for alignment 321.

In some embodiments of the electrically driven sliding window for vehicle of the present application, as shown in FIG. 8, the slide block 4 is further provided with a keyslot 43. The keyslot 43 is defined between the base mating portion 41 and the guide rail mating portion 42 at a side of the middle portion of the slide block 4. The keyslot 43 is generally designed as a rectangular groove extending toward the inside of the slide block 4, and the slide block 4 may be connected to the electric drive mechanism 6 through the keyslot 43, so that the slide block 4 may be driven to move by the electric drive mechanism 6.

Figure 9:
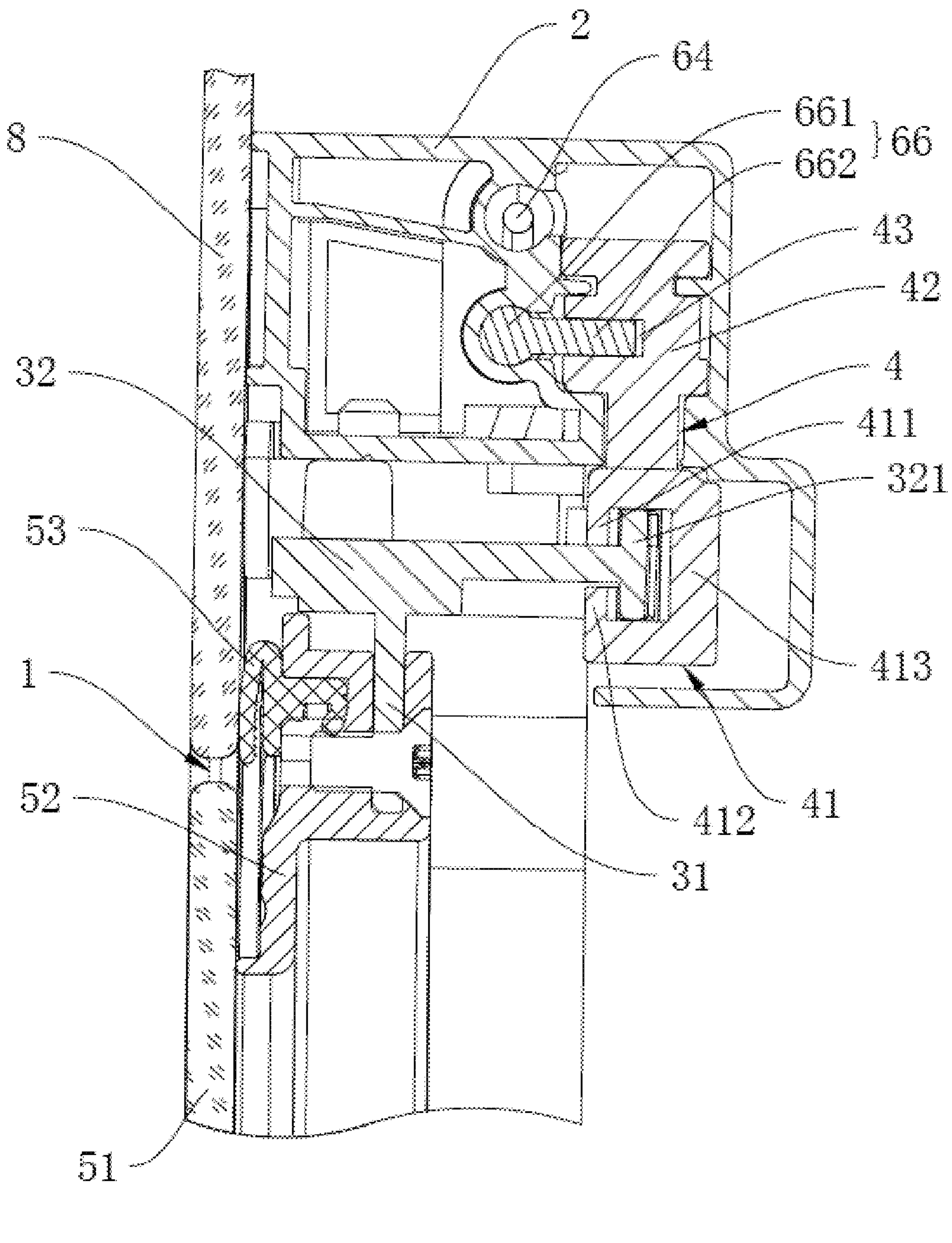
FIG. 9 is a partial cross-sectional schematic diagram showing a slide block of an electrically driven sliding window for vehicle according to the present application in the closed state.

In an optional embodiment of the electrically driven sliding window for vehicle of the present application, as shown in FIGS. 1, 2 and 9, a stationary window 8 with a larger area is provided on the vehicle body, and the window aperture 1 is defined on the stationary window 8. The movable glass unit 5 includes a movable glass 51, a frame for the movable glass 52 and a seal of the movable glass 53. The movable glass 51 is made of a transparent glass and is a main body of the movable glass unit 5. The frame for the movable glass 52 is generally made of an aluminum alloy profile and is arranged at an edge of the movable glass 51 to protect the movable glass 51. The seal of the movable glass 53, which is typically a structural member made of rubber material, is fixed to the frame for the movable glass 52 between the frame for the movable glass 52 and the stationary window 8. When the movable glass unit 5 is in an open state, or is in the process of opening and closing the window, the seal of the movable glass 53 may buffer the vibration of the movable glass unit 5, and prevent an impact between the movable glass unit 5 and the stationary window 8. The seal of the movable glass 53 is also capable of achieving the seal between the movable glass unit 5 and the stationary window 8 when the movable glass unit 5 is in a closed state, which prevents wind and rain outside the vehicle from entering the vehicle through the gap between the movable glass unit 5 and the stationary window 8.

In some embodiments of the electrically driven sliding window for vehicle of the present application, as shown in FIGS. 2 and 9, the electric drive mechanism 6 includes a motor holder 61, a first drive flexible shaft 62, a guide tube for the first drive flexible shaft 63, a second drive flexible shaft 64, a guide tube for the second drive flexible shaft 65, a driver 66, and a drive motor (not shown). The first drive flexible shaft 62 and the second drive flexible shaft 64 are both made of a rubber material having a certain toughness, and spiral drive threads are provided on the outer peripheries of the first drive flexible shaft 62 and the second drive flexible shaft 64.

The first drive flexible shaft 62 and the second drive flexible shaft 64 both extend through the motor holder 61, the drive motor is fixed on the motor holder 61, a driving gear is provided on an output shaft of the drive motor, and two opposite sides of the driving gear are respectively meshed with the first drive flexible shaft 62 and the second drive flexible shaft 64, so that when the drive motor rotates, the driving gear may drive the first drive flexible shaft 62 and the second drive flexible shaft 64 to respectively move synchronously to two opposite sides of the motor holder 61.

The guide tube for the first drive flexible shaft 63 and the guide tube for the second drive flexible shaft 65 are smooth pipes fixed around the window aperture 1. Generally, the motor holder 61 is provided on the side of the window aperture 1 in closed direction of the movable glass unit 5, and the guide tube for the first drive flexible shaft 63 and the guide tube for the second drive flexible shaft 65 both extend from the upper and lower sides of the motor holder 61 upwards and downward, turn at the upper and lower sides of the window aperture 1, and extend in the opening direction of the movable glass unit 5. The first drive flexible shaft 62 passes through the guide tube for the first drive flexible shaft 63, and one end of the first drive flexible shaft 62 protrudes from the end of the guide tube for the first drive flexible shaft 63 and extends in the guide rail 2 on the upper side of the window aperture 1 along the guide rail 2. The guide tube for the first drive flexible shaft 63 below the motor holder 61 extends into the guide rail 2 at the lower side of the window aperture 1 to accommodate the other end of the first drive flexible shaft 62. The second drive flexible shaft 64 passes through the guide tube for the second drive flexible shaft 65, and one end of the second drive flexible shaft 64 protrudes from the end of the guide tube for the second drive flexible shaft 65 and extends in the guide rail 2 on the lower side of the window aperture 1 along the guide rail 2. The guide tube for the second drive flexible shaft 65 above the motor holder 61 extends into the guide rail 2 on the upper side of the window aperture 1 to accommodate the other end of the second drive flexible shaft 64.

The first drive flexible shaft 62 and the second drive flexible shaft 64 are each fixedly connected with a driver 66. The driver 66 on the first drive flexible shaft 62 is fixed on an end of the first drive flexible shaft 62 in the guide rail 2 on the upper side of the window aperture 1, and is connected to the slide block 4 on the upper side of the window aperture 1 via the driver 66. The driver 66 on the second drive flexible shaft 64 is fixed on an end of the second drive flexible shaft 64 in the guide rail 2 on the lower side of the window aperture 1, and is connected to the slide block 4 via the driver 66. When the drive motor rotates, the first drive flexible shaft 62 and the second drive flexible shaft 64 are driven to move synchronously in opposite directions, so that the slide blocks 4 on the upper and lower sides of the window aperture 1 move synchronously in the same direction on the guide rail 2, thereby pushing the movable glass unit 5 to move smoothly. In an optional embodiment of the electrically driven sliding window for vehicle of the present application, as shown in FIG. 9, the driver 66 includes a driver body 661 and a drive block 662. The driver body 661 may be designed as a cylinder with a diameter comparable to that of the drive flexible shaft, and the end of the driver body 661 is fixedly connected, typically integrally connected, to the first drive flexible shaft 62 or the second drive flexible shaft 64. The drive block 662, which is typically made of a rubber or elastic plastic, is configured at one side of the driver body 661 and is generally designed in a rectangular shape adapted to the shape of the keyslot 43. The driver 66 is connected to the slide block 4 through the drive block 662, and generally is detachably connected with the slide block 4 by inserting the drive block 662 into the keyslot 43.

The electrically driven sliding window for vehicle of any of the embodiments of the present application is used for the embodiment of the vehicle of the present application, with the advantages of the corresponding embodiment of the electrically driven sliding window for vehicle of the present application.

In the description of the present disclosure, the description with the terms such as "one embodiment", "a specific embodiment", "an optional embodiment", etc. mean that a specific feature, structure, material, or characteristic described in connection with the embodiment or example is included in at least one embodiment or example of the present disclosure. In the present disclosure, schematic representations of the above terms do not necessarily refer to the same embodiment or example. Further, the specific features, structures, materials, or characteristics described may be combined in any suitable manner in any one or more embodiments or examples.

The above-mentioned optional embodiments of the present application do not limit the scope of protection of the present application, and therefore all changes which come within the meaning and range of equivalence of the claims are to be embraced within their scope.

LIST OF REFERENCE SIGNS

1 window aperture
2 guide rail
21 limit block for opening movement
22 limit block for closing movement
3 base
31 glass mounting portion
32 guide portion
321 slide rail for alignment
322 base limiting block
323 baffle for slide block
4 slide block
41 base mating portion
411 first clamping edge
412 second clamping edge
413 clamping arm
42 guide rail mating portion
43 keyslot
5 movable glass unit
51 movable glass
52 window frame
53 seal of the movable glass
6 electric drive mechanism
61 motor holder
62 first drive flexible shaft
63 guide tube for the first drive flexible shaft
64 second drive flexible shaft
65 guide tube for the second drive flexible shaft
66 driver
661 driver body
662 drive block
7 movement controlling mechanism
71 toggle
711 rotary mounting portion
712 driving lever
72 torsion spring
73 guide block for alignment
731 guide surface
732 push rod for the toggle
8 stationary window

What is claimed is:

1. An electrically driven sliding window for a vehicle, comprising a window aperture, guide rails, bases, slide blocks, a movable glass unit, an electric drive mechanism, and a movement controlling mechanism, wherein the guide rails are provided on two opposite sides of the window aperture respectively, each of the slide blocks comprises a base mating portion and a guide rail mating portion, each of the slide blocks is slidably mounted on a respective one of the bases via the base mating portion and is mounted on a respective one of the guide rails via the guide rail mating portion, the movable glass unit is fixed on the bases, and the slide blocks are slidable along the guide rails and are slidable relative to the bases by means of the electric drive mechanism, to drive the bases to perform a sliding movement parallel to a direction of the guide rails and a movement for alignment perpendicular to the direction of the guide rails, wherein each of the bases comprises a glass mounting portion and a guide portion, the glass mounting portion is parallel to the guide rails, the guide portion is provided with a slide rail for alignment, the movable glass unit is fixed on the glass mounting portion, the slide rail for alignment extends along the glass mounting portion, a distance of the slide rail for alignment from an inside of the glass mounting portion is different from a distance of the slide rail for alignment from an outside of the glass mounting portion, the base mating portion is mounted on the slide rail for alignment, and the movement controlling mechanism is configured to control a sliding of each of the slide blocks on the slide rail for alignment to realize a sliding movement or a movement for alignment of the movable glass unit.

2. The electrically driven sliding window for the vehicle according to claim 1, wherein the movement controlling mechanism comprises a toggle, a torsion spring and a guide block for alignment, the toggle comprises a rotary mounting portion and a driving lever and is rotatably mounted on the guide portion via the rotary mounting portion, the torsion spring is mounted between the toggle and the guide portion to push the driving lever into contact with a respective one of the slide blocks, to limit a movement of the respective one of the slide blocks on the slide rail for alignment, and the guide block for alignment is fixed on an end of a respective one of the guide rails adjacent to the window aperture to push the driving lever to move in a direction away from the slide rail for alignment when the movable glass unit slides to a position directly opposite the window aperture.

3. The electrically driven sliding window for the vehicle according to claim 2, wherein the guide portion is further provided with base limiting blocks, the base limiting blocks are provided at two ends of the guide portion respectively, each of the guide rails is provided with a limit block for opening movement and a limit block for closing movement, the guide block for alignment is configured with a guide surface and a push rod for toggle, the limit block for opening movement is provided at a position at an end of each of the guide rails away from the window aperture opposite a corresponding one of the base limiting blocks, the guide surface is provided at a position directly opposite the corresponding one of the base limiting blocks, the limit block for closing movement and the guide surface are configured to limit the corresponding one of the base limiting blocks at each of the two ends of the guide portion when the movable glass unit is in the window aperture, and the push rod for toggle is configured to press the driving lever when the movable glass unit moves to the position directly opposite the window aperture, so as to push the driving lever away from the respective one of the slide blocks.

4. The electrically driven sliding window for the vehicle according to claim 1, wherein the base mating portion comprises a first clamping edge, a second clamping edge and a clamping arm, the first clamping edge and the second clamping edge are respectively provided on two opposite sides of the clamping arm, so that a sliding groove adapted to the slide rail for alignment is formed among the first clamping edge, the second clamping edge and the clamping arm.

5. The electrically driven sliding window for the vehicle according to claim 1, wherein each of the slide blocks further comprises a keyslot in a middle of each of the slide blocks, and the slide blocks are connected to the electric drive mechanism via the keyslot.

6. The electrically driven sliding window for the vehicle according to claim 1, wherein the window aperture is defined on a stationary window, and the movable glass unit comprises a movable glass, a frame for the movable glass on an edge of the movable glass, and a seal of the movable glass between the frame for the movable glass and the stationary window.

7. The electrically driven sliding window for the vehicle according to claim 1, wherein the electric drive mechanism comprises a motor holder, a first drive flexible shaft, a guide tube for the first drive flexible shaft, a second drive flexible shaft, a guide tube for the second drive flexible shaft, drivers and a drive motor, the first drive flexible shaft and the second drive flexible shaft both extend through the motor holder, the guide tube for the first drive flexible shaft is sleeved on the first drive flexible shaft, such that one end of the first drive flexible shaft is located in a first guide rail of the guide rails on a first side of the window aperture and extends along the guide rails, the guide tube for the second drive flexible shaft is sleeved on the second drive flexible shaft, such that one end of the second drive flexible shaft is located in a second guide rail of the guide rails on a second side of the window aperture and extends along the guide rails, the drivers are respectively arranged on the first drive flexible shaft and the second drive flexible shaft and are connected to a respective one of the slide blocks respectively, and the drive motor is fixed on the motor holder to drive the first drive flexible shaft and the second drive flexible shaft to move synchronously to opposite sides of the motor holder.

8. The electrically driven sliding window for vehicle according to claim 7, wherein each of the drivers comprises a driver body and a drive block, the drive block is fixed on one side of the driver body, the driver body is connected to the first drive flexible shaft or the second drive flexible shaft, and the drive block is connected to a respective one of the slide blocks.

9. A vehicle, comprising the electrically driven sliding window for the vehicle according to claim 1.

* * * * *